(12) United States Patent
Lee et al.

(10) Patent No.: US 11,947,023 B2
(45) Date of Patent: Apr. 2, 2024

(54) TRACKING NON-GEO SYNCHRONOUS ORBIT SATELLITES ON ORBITING PLANES OF REGULAR MOTION PATTERNS

(71) Applicants: Lin-Nan Lee, Potomac, MD (US); Peter Hou, North Potomac, MD (US); Victor Liau, Germantown, MD (US)

(72) Inventors: Lin-Nan Lee, Potomac, MD (US); Peter Hou, North Potomac, MD (US); Victor Liau, Germantown, MD (US)

(73) Assignee: Hughes Network Systems, Germantown, MD (US)

( * ) Notice: Subject to any disclaimer, the term of this patent is extended or adjusted under 35 U.S.C. 154(b) by 434 days.

(21) Appl. No.: 17/245,301

(22) Filed: Apr. 30, 2021

(65) Prior Publication Data

US 2022/0128708 A1     Apr. 28, 2022

Related U.S. Application Data

(60) Provisional application No. 63/104,043, filed on Oct. 22, 2020.

(51) Int. Cl.
| | |
|---|---|
| *G01S 19/42* | (2010.01) |
| *G01S 19/14* | (2010.01) |
| *H01Q 3/02* | (2006.01) |

(52) U.S. Cl.
CPC .............. *G01S 19/42* (2013.01); *G01S 19/14* (2013.01); *H01Q 3/02* (2013.01)

(58) Field of Classification Search
CPC ....... G01S 19/14; G01S 19/42; H01Q 19/175; H01Q 3/02; H01Q 3/2658; H04B 7/18517; H04B 7/18541; H04B 7/195
See application file for complete search history.

(56) References Cited

U.S. PATENT DOCUMENTS

| | | | |
|---|---|---|---|
| 2003/0128159 A1 | 7/2003 | Chapelle et al. | |
| 2020/0382206 A1* | 12/2020 | Adams | H04B 7/18573 |

FOREIGN PATENT DOCUMENTS

| | | |
|---|---|---|
| EP | 1025618 A1 | 8/2000 |
| WO | 9922422 A1 | 5/1999 |
| WO | 2016092369 A1 | 6/2016 |

OTHER PUBLICATIONS

International Search Report for PCT Application No. PCT/US2021/071710.

* cited by examiner

*Primary Examiner* — Nader Bolourchi
(74) *Attorney, Agent, or Firm* — Capitol City TechLaw; Jasbir Singh

(57) ABSTRACT

A system and method for tracking non-geo synchronous orbit satellites on orbiting planes of regular motion patterns. The method includes providing a first satellites moving in a direction descending in latitude in first orbital planes and a second satellites moving in a direction ascending in latitude in second orbital planes; steering an antenna to an antenna tilt φ from normal with a single axis mechanism lined up with a first axis; scanning, electronically, with a linear array at a scan angle ψ along a second axis; and locking to a signal from a handed-from satellite from the first satellites, where the first axis is angled from the second axis, the steering along the first axis and the scanning along the second axis jointly track the handed-from satellite, the first orbits seem parallel, the second orbits seem parallel, and the first orbits seem aligned with the antenna tilt φ. A handoff between the first satellites may use one of the second satellites as a steppingstone.

20 Claims, 7 Drawing Sheets

| Handoff From | Handoff To | time (sec) | φ (deg) | Ψ "from" (deg) | Ψ "to" (deg) |
|---|---|---|---|---|---|
| leo0601 | leo0112 | 120 | 49.2 | -41.3 | 22.1 |
| leo0112 | leo0623 | 375 | -50.0 | 13.5 | -55.6 |
| leo0623 | leo0110 | 660 | 49.2 | -59.6 | 8.5 |
| leo0110 | leo0621 | 944 | -49.9 | 1.7 | -62.6 |
| leo0621 | leo0108 | 1180 | 49.2 | -61.9 | -3.1 |
| leo0108 | leo0719 | 1445 | -49.9 | -9.2 | 57.5 |
| leo0719 | leo0106 | 1710 | 49.2 | 56.0 | -15.0 |
| leo0106 | leo0717 | 1970 | -49.9 | -20.5 | 50.7 |
| leo0717 | leo0104 | 2230 | 49.1 | 49.8 | -25.4 |
| leo0104 | leo0715 | 2500 | -49.5 | -30.4 | 45.9 |

700

Provide a first set of satellites moving in a first direction along first parallel orbits that intersect at a first pair of poles, and a second set of satellites moving in a second direction along second parallel orbits that intersect at a second pair of poles 702

Steer an antenna to a mechanical antenna tilt φ from normal with a single axis mechanism lined up with a first axis 704

Scan, electronically, with a linear array at a scan angle ψ along a second axis 706

Lock to a signal from a handed-from satellite from the first set of satellites 708

Calculate, periodically, the mechanical antenna tilt φ for the steering and the scan angle ψ for the scanning 710

Select a handed-to satellite from the second set of satellites 712

Determine an instant when a mechanical antenna tilt φ' from normal of the handed-to satellite is equal to the mechanical antenna tilt φ from normal of the handed-from satellite 714

Calculate a scan angle ψ' for the handed-to satellite at the instant 716

Set, at the instant, the scan angle ψ to the scan angle ψ' to perform a handoff from the handed-from satellite to the handed-to satellite 718

FIG. 7

TRACKING NON-GEO SYNCHRONOUS ORBIT SATELLITES ON ORBITING PLANES OF REGULAR MOTION PATTERNS

CROSS-REFERENCE TO RELATED APPLICATIONS AND INCORPORATION BY REFERENCE

The present application claims the benefit under 35 U.S.C. 119(e) of U.S. Provisional Application Ser. No. 63/104,043, filed Oct. 22, 2020, which is incorporated herein by reference in its entirety.

FIELD

A system and method to track Non-Geo Synchronous Orbit (NGSO) satellites on orbiting planes of regular motion patterns is disclosed. In particular, the system and method direct an antenna with mechanical steering along a first axis and a linear array along a second axis orthogonal to the first axis to track the NGSO satellite.

BACKGROUND

Antenna design for Non-Geo Synchronous Orbit (NGSO) satellites such as Low Earth Orbit (LEO) and Medium Earth Orbit (MEO) satellites is challenging. For NGSO Satellite Networks, the satellite moves with respect to the user terminals and a user terminal antenna must track the satellite motion to close the link. The antenna must also handoff from one satellite to another. To maintain service continuity, a so called "make-before-break" handoff is necessary. To support that, two such antennas (or two beams in the case of phase array antenna) are needed, each tracking a different satellite during the handoff process until it is completed.

For mechanical tracking antenna, each antenna needs two (2) axes to support the 2 degrees of freedom. For an electronic phase array antenna, only one array is needed because phase array antenna can form two beams at the same time. But the electronic phase array antenna needs to be scanning in 2 dimensions as well, implying a 2-dimensional phase array. To achieve high gain, the 2-dimensional array typically requires a very large number of elements, which becomes very expensive.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system of one or more computers can be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. One general aspect includes a method for tracking non-geo synchronous orbit satellites on orbiting planes of regular motion patterns. The method includes providing a first satellites moving in a direction descending in latitude in first orbital planes and a second satellites moving in a direction ascending in latitude in second orbital planes; steering an antenna to an antenna tilt $\varphi$ from normal with a single axis mechanism lined up with a first axis; scanning, electronically, with a linear array at a scan angle $\psi$ along a second axis; and locking to a signal from a handed-from satellite from the first satellites, where the first axis is angled from the second axis, the steering along the first axis and the scanning along the second axis jointly track the handed-from satellite, the first orbits seem parallel, the second orbits seem parallel, and the first orbits seem aligned with the antenna tilt $\varphi$. Other embodiments of this aspect include corresponding computer systems, apparatus, and computer programs recorded on one or more computer storage devices, each configured to perform the actions of the methods.

Implementations may include one or more of the following features. The method where the first axis is orthogonal to the second axis. The method where the first axis is parallel to the first direction. The method may include receiving the antenna tilt $\varphi$ for the steering and the scan angle $\Psi$ for the scanning for a particular time period. The method may include calculating, periodically, the antenna tilt $\varphi$ for the steering and the scan angle $\psi$ for the scanning. The method where the antenna tilt $\varphi$ and the scan angle $\Psi$ are calculated based on azimuth and elevation angles used in locating a celestial object from the earth surface. The method where the linear array is disposed at a center-fed focal point or an offset from the center-fed focal point of the antenna. The method where the direction descending in latitude is opposite the direction ascending in latitude. The method where the handed-from satellite is line-of-sight (LOS) from the antenna and a LOS calculation of the handed-from satellite is based on a tilt range and a scan angle range of the antenna. The method may include: selecting a handed-to satellite from the second satellites; determining an instant when an antenna tilt $\varphi'$ from normal of the handed-to satellite is equal to the antenna tilt $\varphi$ from normal of the handed-from satellite; calculating a scan angle $\psi'$ for the handed-to satellite at the instant; and setting, at the instant, the scan angle $\psi$ to the scan angle $\psi'$ to perform a handoff from the handed-from satellite to the handed-to satellite. The selecting selects from one or more satellites of the second satellites that are LOS of the antenna based on a tilt range and a scan angle range of the antenna, and selects a furthest satellite, from the antenna, from the one or more satellites of the second satellites. Implementations of the described techniques may include hardware, a method or process, or computer software on a computer-accessible medium.

One general aspect includes a system to track non-geo synchronous orbit satellites on orbiting planes of regular motion patterns. The system includes a first satellites moving in a direction descending in latitude in first orbits; a second satellites moving in a direction ascending in latitude in second orbits; an antenna to steer to tilt the antenna to an antenna tilt $\varphi$ from normal with a single axis mechanism lined up with a first axis; a linear array to scan, electronically, at a scan angle $\psi$ along a second axis; and a receiver to lock to a signal from a handed-from satellite from the first satellites, where the first axis is angled from the second axis, the steering along the first axis and the scanning along the second axis jointly track the handed-from satellite, the first orbits seem parallel, the second orbits seem parallel, and the first orbits seem aligned with the antenna tilt $\varphi$. Other embodiments of this aspect include corresponding computer systems, apparatus, and computer programs recorded on one or more computer storage devices, each configured to perform the actions of the methods.

Additional features will be set forth in the description that follows, and in part will be apparent from the description, or may be learned by practice of what is described.

DRAWINGS

In order to describe the way, the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail using the accompanying drawings.

FIG. 7 illustrates a method for tracking NGSO satellites on orbiting planes of regular motion patterns according to various embodiments.

Figure 1A:
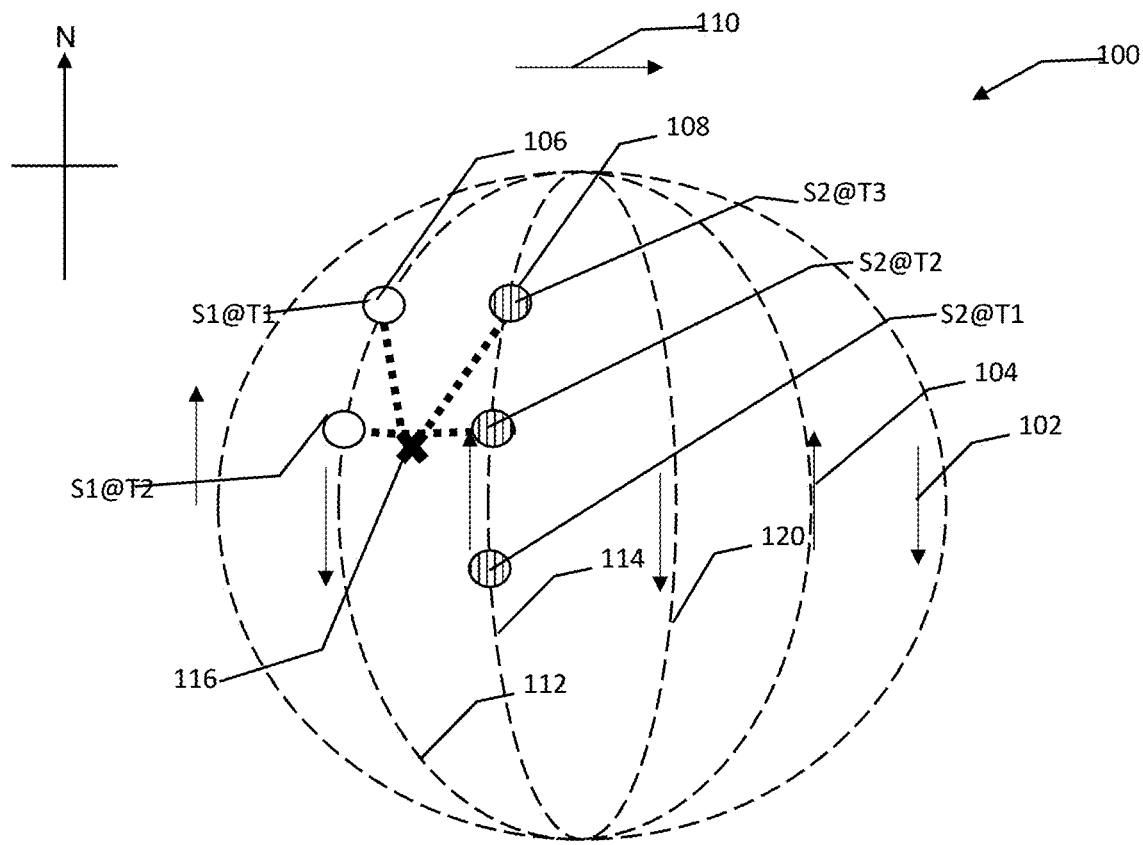
FIG. 1A illustrates a NGSO satellite network from a point on the ground according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

The present teachings disclose mechanical and electronic scanning in one antenna. The antenna includes a reflector that is parabolic in one dimension, and flat in the other dimension, to form a cylindrical parabolic reflector. A linear phased array may be arranged as a bar and placed in and aligned with the focal line of the cylindrical parabolic reflector. The antenna further includes a single-axis steering capable to move the direction of the reflector and scan the reflected wave in a dimension that may be orthogonal or slightly inclined from the orthogonal with respect to the focal line. The linear array can form two beams simultaneously and each beam may be scanned electronically in two different directions. While this combination is relatively straightforward, but what is new is the way we apply them to LEO and MEO antenna tracking and the advantages this antenna brings.

The present teachings offer substantial cost advantages over both pure mechanical and pure phase array antennas for the user terminal. Compared to mechanical antennas, the present teachings use only one antenna to support make-before-break handoff instead of two antennas. Moreover, the present teachings use a single-axis mechanism whereas each of mechanical antennas of the prior art need to steer on two axes. The two-axes steering is much more complex and expensive. It is also more flexible in the sense of finding a suitable site during installation for one rather than two antennas when compared to a pure mechanical solution. Compared to a pure electronics/phase array with n elements, the linear array needs only sqrt(n) elements, plus a reflector. Overall, the approach is much less expensive.

With a specific type of LEO and/or MEO satellite constellation, it is possible to simplify the ground antenna system for terminals. A linear array can form two beams during handoff. The linear array may steer the beam in one dimension, while the reflector is steered in the other dimension mechanically. A linear array requires much smaller number of elements than a 2-dimensional array, i.e., square root of the number of elements required for a 2-dimensional array. Moreover, single-axis steering is less expensive and very reliable compared to a 2-axes mechanical steering system.

INTRODUCTION

FIG. 1A illustrates a NGSO satellite network from a point on the ground according to various embodiments.

Figure 1B:
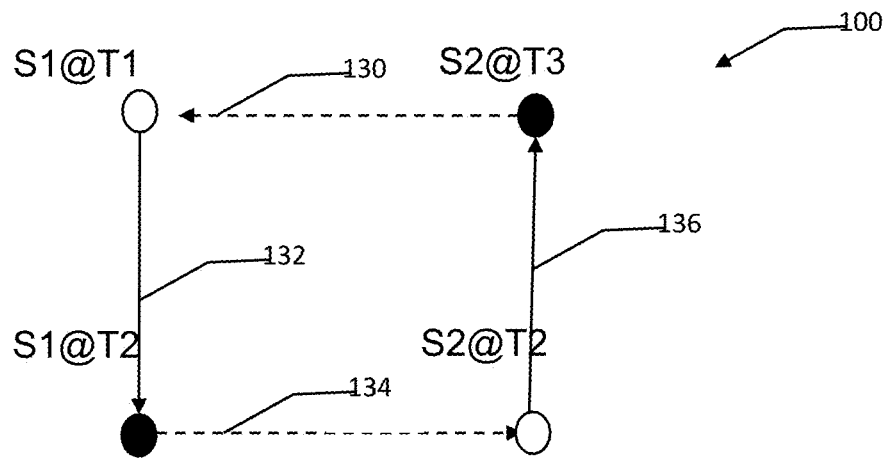
FIG. 1B illustrates boresight tracking of satellites in an NGSO satellite network in some embodiments.

FIG. 1B illustrates boresight tracking of satellites in an NGSO satellite network in some embodiments.

FIG. 1A illustrates a NGSO satellite network 100 from a point on the ground. A first satellite 106 in a first orbital plane 112 moves in a N-S direction 102 with a Western drift 110 due to earth's rotation (for convenience, a N-S direction is used). A second satellite 108 in a second orbital plane 114 moves in a S-N direction 104 for this embodiment, the N-S direction is defined as descending in latitude herein) with the Western drift 110 due to earth's rotation. An antenna 116, communicating with or disposed in, for example, a User Terminal (UT), may include a steering aligned with the N-S direction 102 and a phase array to account for the western drift 110 (E-W) of a NGSO satellite's motion of the first satellite 106 and the second satellite 108 may be tracked. In some embodiments, misalignment due to orbit inclination of the first satellite 106 and the second satellite 108 may be compensated for. The first orbital plane 112 and the second orbital plane 114 may in a near-earth orbit, a near-earth polar orbit, an inclined near-earth orbit, a highly elliptical orbit or the like. An example of a highly elliptical orbit is the Molina orbit.

In FIG. 1A and FIG. 1B the position of the first satellite 106 at time T1 and T2 is indicated as S1@T1 and S1@T2, respectively. Connectivity between the first satellite 106 and the antenna 116 is from T1 to T2; there is no connection between the first satellite 106 and the antenna 116 at T3. A first beam is illustrated as the dashed lines from the antenna 116 to the first satellite 106 at positions S1@T1 and S1@T2. Similarly, the position of the second satellite 108 at time T1, T2 and is indicated as S2@T1, S2@T2 and S2@T3, respectively. Connectivity between the second satellite 108 and the antenna 116 is from T2 to T3; there is no connection between the second satellite 108 and the antenna 116 at T1. A second beam is illustrated as the dashed lines from the antenna 116 to the second satellite 108 at positions S2@T2 and S2@T3.

At T1, the first satellite 106 may be positioned so as to be in a line-of-sight of the antenna 116 in the first orbital plane 112, and the first beam may be generated for the antenna 116 to pick up the first satellite 106. As the first satellite 106 moves, the antenna 116 mechanically tracks the movement of the first satellite 106 until T2 with the steering along direction 132 (FIG. 1B) and electronic steering of the linear array signals along direction 134 to maintain the first beam (now S1@T2), where T2 is the handoff moment. At handoff, a second beam can be generated to pick up the second satellite 108 in the second orbital plane 114. The second satellite 108 may be positioned so as to be in a line-of-sight of the antenna 116. After handoff is completed, the first beam is dropped off (in other words at or near T2) while connectivity via the second beam is maintained until T3. As the second satellite 108 moves, the antenna 116 mechanically tracks the movement of the second satellite 108 until T3 with the steering along direction 136 (FIG. 1B) and electronic steering of the linear array signals along direction 130 to maintain the second beam (now S2@T3).

At T3, the antenna may connect to a third satellite (not shown). The third satellite may be trailing the first satellite 106 while moving in the first orbital plane 112. When the western drift 110 of the first orbital plane 112 relative to the antenna 116 has sufficiently drifted, the third satellite may be moving in a third orbital plane 120. The third orbital plane 120 may be further East of the first orbital plane 112 and the second orbital plane 114.

In some embodiments, the first orbital plane 112 and the second orbital plane 114 are not-inclined relative one another. In this embodiment, satellites may travel in opposing directions (for example, N-S and S-N) in the first orbital plane 112 and the second orbital plane 114. Opposing direction travel may enable the single-axis steering of the antenna 116 to make a back-and-forth constant motion. In some embodiments, a total number of orbital planes, polar or non-polar, may be an odd number. The odd number of orbital planes may ensure the satellite motion can be arranged in alternating directions. When the total number of orbital planes is an even number, the terminal may elect to skip one of the orbital planes when directions of satellite motion are opposing in alternate orbital planes. LEO orbits may be called 2-hour orbits. A period of the NGSO orbit is determined by its radius, which is in the 7000 km to 7600 km range, dominated by earth radius, For a constellation with m orbital planes, the orbital planes are separated by an angle π/m. In some embodiments, it takes 12/m hours to move from the next orbital plane to replace the current plane. For an orbital plane with n satellites, it takes about 120/n min for the next satellite to move to the same position on the plane. Satellites on the same orbital plane moves pass the same spot on the earth much more frequently than a satellite on the next orbital plane.

Figure 2:
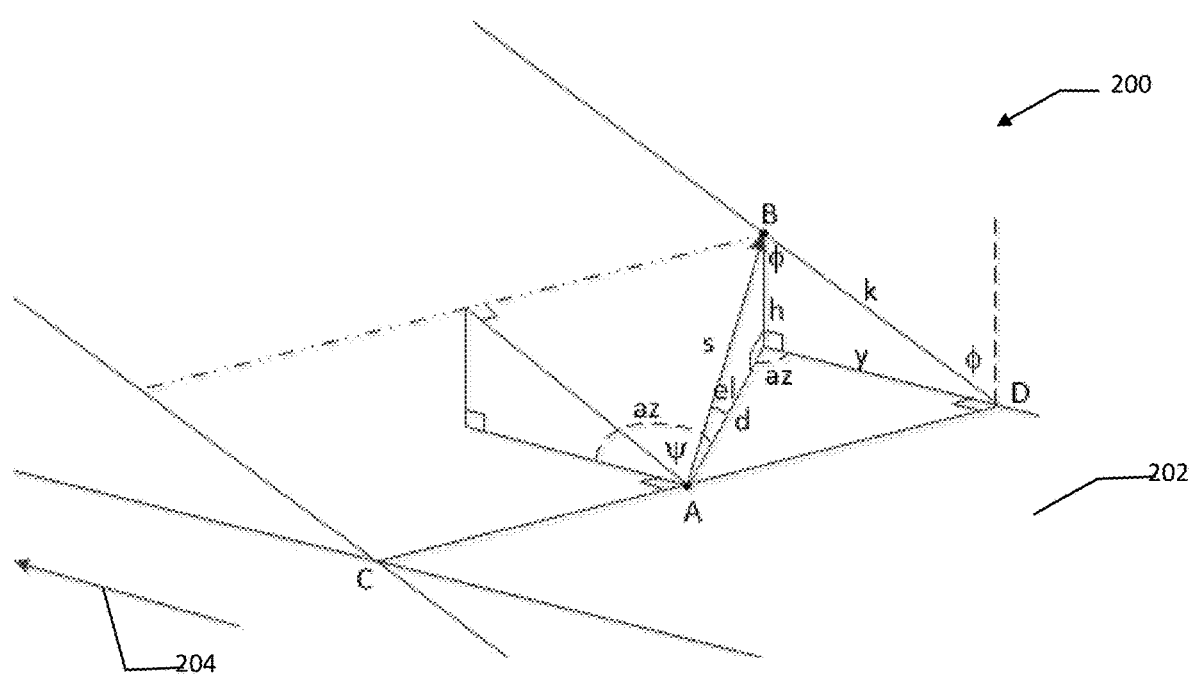
FIG. 2 illustrates NGSO satellite tracking at a terminal according to various embodiments.

FIG. 2 illustrates NGSO satellite tracking at a terminal according to various embodiments.

FIG. 2 illustrates a NGSO satellite tracking system 200. A terminal/antenna at location A may track a satellite at B. In FIG. 2, a line CD is the intersection of a plane 202 containing the great circle through the terminal's latitude and a plane 202 that is tangential to earth at point A. Line CD may be a hinge for the antenna steering or mechanical tracking. E may point in space along the antenna boresight, direction 204 may be North, an elevation el, an azimuth az and a slant range s. An antenna tilt $\varphi$ from normal and a linear phase array scan angle $\Psi$ may be determined as follows:

d=s cos(el)
h=s sin(el)
y=d cos(az)
k=sqrt(h$^2$+y$^2$)
$\varphi$=tan$^{-1}$(y/h)
$\Psi$=cos$^{-1}$(k/s)

Antenna Embodiment

Figure 3:
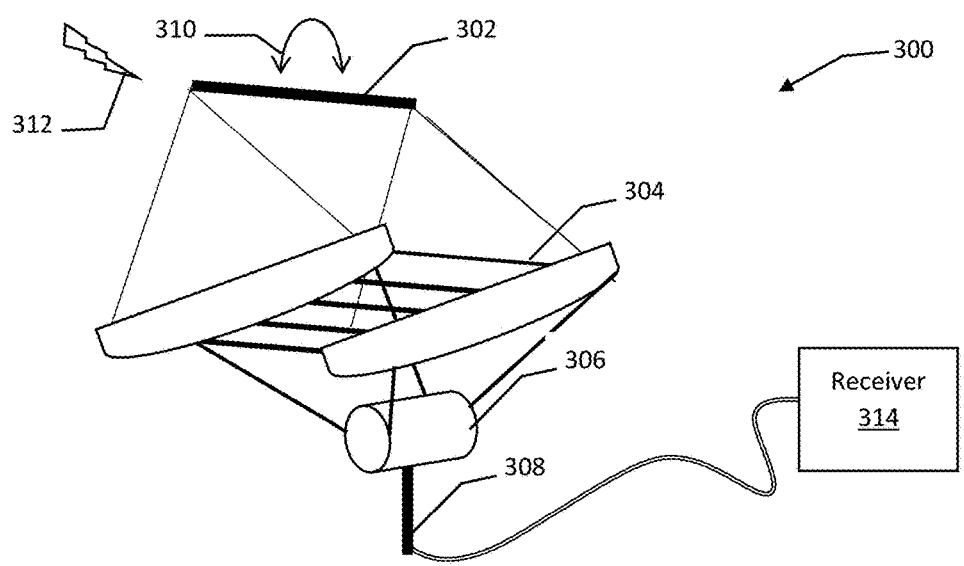
FIG. 3 illustrates an exemplary antenna according to various embodiments.

FIG. 3 illustrates an exemplary antenna according to various embodiments.

An antenna 300 mounted to a pole 308 may include a reflector 304 curved in a parabolic shape (for example) in one dimension, while being flat in the other dimension. The antenna 300 may include a linear array 302 disposed, for example, in a traditional center-fed position as a bar on a focal point of the reflector 304. In some embodiments, the linear array 302 may be an offset feed or a dual optics configuration to minimize blockages. A motor 306 may provide a steering along the arc 310 to keep the antenna 300 pointing upwards to a NGSO satellite (not shown). The present tracking scheme for antenna 300 is limited to a range of motion provided by the motor 306, reducing wear and tear and enhancing the longevity. The antenna 300 may be used to receive a signal 312 connected to receiver 314 disposed in for example, a terminal. The signal 312 from a satellite, for example, a NGSO satellite.

Exemplary LEO Polar-Orbit Satellite and Handoff Patterns

The following table lists assumptions used for two exemplary NGSO satellite systems, namely, Iridium and a Telesat-like system, where the Telesat-like hypothetical LEO system may include 11 planes instead of the 12 planes for Telesat.

|  | Iridium | Telesat-like |
| --- | --- | --- |
| No. of planes | 6 | 11 |
| Separation between planes | 30 deg | 16.4 deg |
| No. of satellites per plane (n) | 11 | 24 |
| Separation between satellites (b) | 32.7 deg | 15 deg |
| Total No. of satellites | 66 | 264 |
| Orbit height (h) | 1000 km | 1000 km |
| Field of view from satellite (j) | +/−45 deg | +/−30 deg |
| Time between Planes due to Earth Spin | ~2 hours | ~1 hour |
| Time between Satellites on the same plane | ~11 min | 5 min |

Figures 4A, 4B:
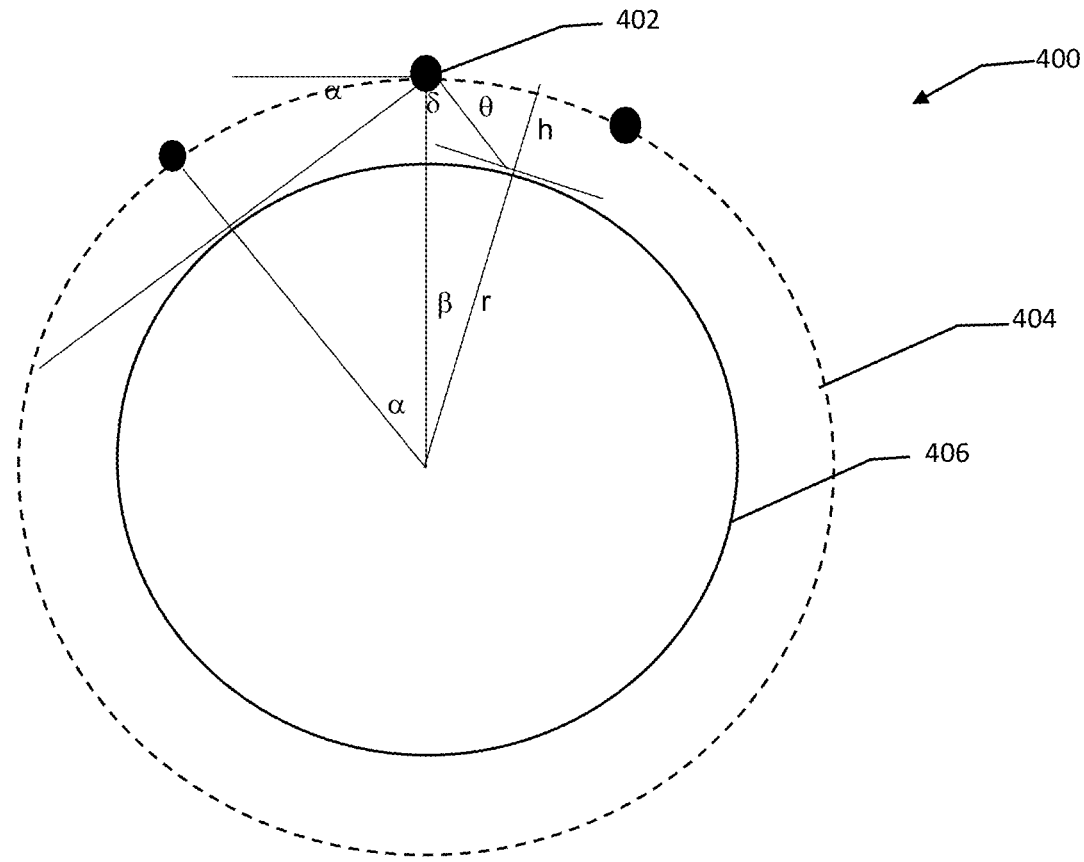
FIG. 4A illustrates exemplary variables needed for the present teachings according to various embodiments.
FIG. 4B illustrates antenna angles at handoff at the Equator for a satellite network having 11 polar orbital planes and 24 satellites per plane, according to various embodiments.

FIG. 4A illustrates exemplary variables needed for the present teachings according to various embodiments.

A NGSO satellite system 400 may include a satellite 402 in orbit 404 around earth 406. For the system 400 a ground scan angle (θ) and satellite scan angle (δ) are related by θ=β+δ. When the system 400 is a Telesat-like system, the r is 6,380 km, h is 1000 km, α is 30 degrees, β is 15 degrees, θ is 45 degrees and $\varphi$ is 30 degrees. The worst case for E-W scan is a ground terminal located right under an orbital plane, where the terminal needs to look at the satellite on the other orbital plane, for example, towards E. As such, for a Telesat-like constellation, the max scanning range in E-W direction may be about 45 degrees. For the Telesat-like constellation, a maximum scanning range is +/−23 deg in the N-S direction and ~+/−45 deg in the E-W direction.

FIG. 4B illustrates antenna angles at handoff at the Equator for a satellite network having 11 polar orbital planes and 24 satellites per plane, according to various embodiments.

Figure 4C:
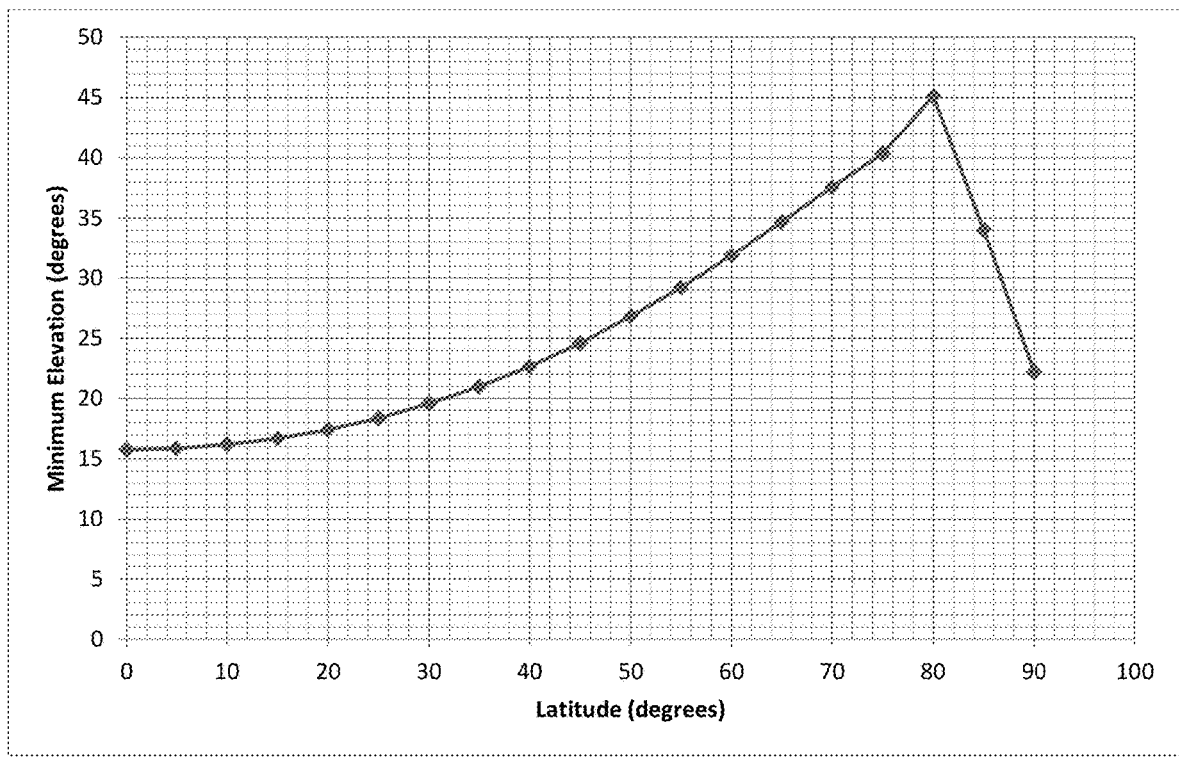
FIG. 4C illustrates a terminal look angle for a satellite network having 11 polar orbital planes and 24 satellites per plane, according to various embodiments.

FIG. 4C illustrates a terminal look angle for a satellite network having 11 polar orbital planes and 24 satellites per plane, according to various embodiments.

Figure 4D:
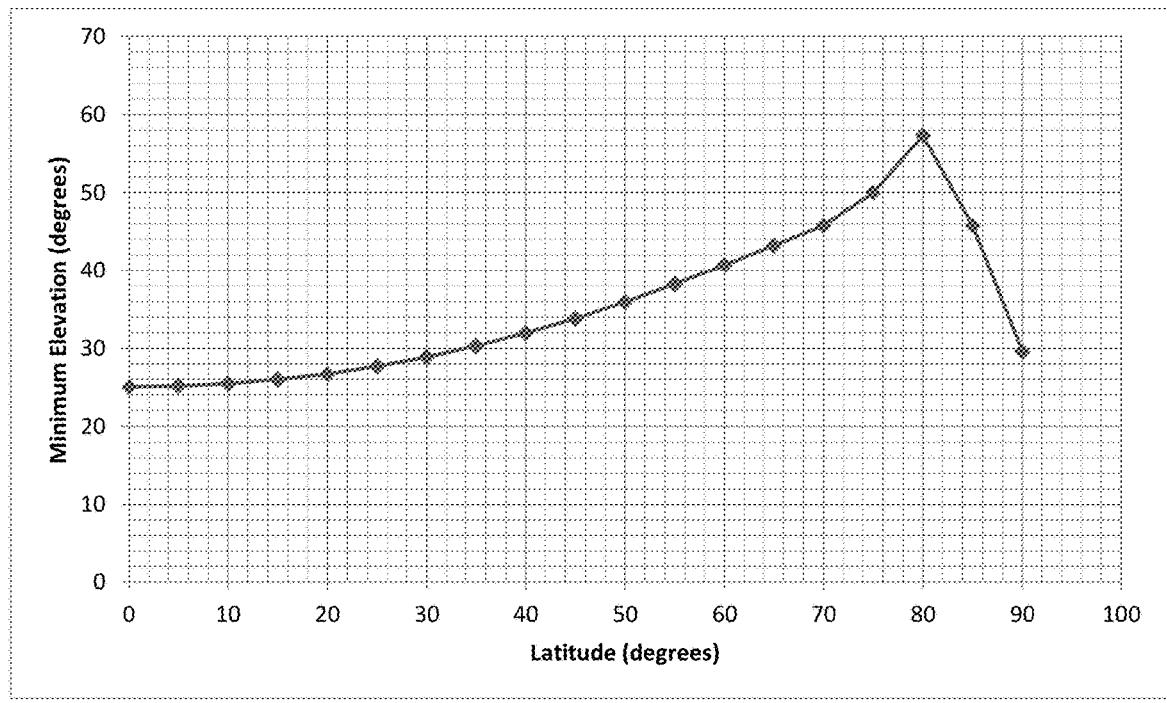
FIG. 4D illustrates a terminal look angle for a satellite network having 15 polar orbital planes and 30 satellites per plane, according to various embodiments.

FIG. 4D illustrates a terminal look angle for a satellite network having 15 polar orbital planes and 30 satellites per plane, according to various embodiments.

Figure 5:
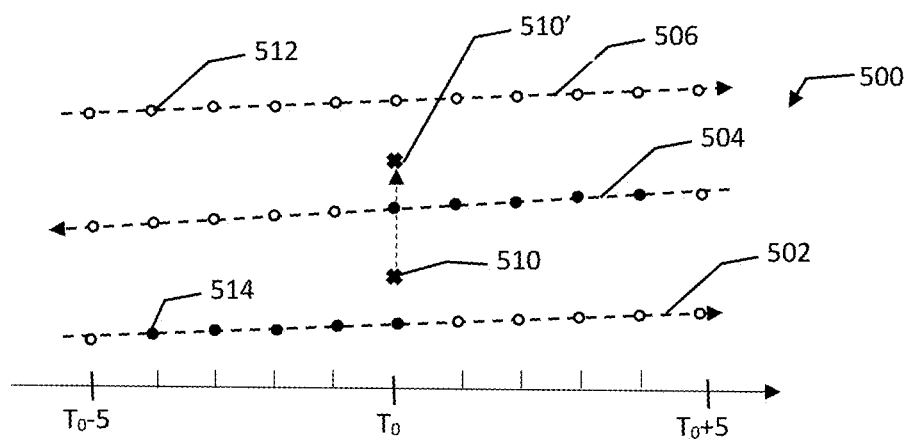
FIG. 5 illustrates a progression of serving satellites according to various embodiments.

FIG. 5 illustrates a progression of serving satellites according to various embodiments.

FIG. 5 illustrates a satellite network 500 including an orbital plane k−1 502, an orbital plane k 504 and an orbital plane k+1 506. Satellites for the satellite network 500 may be moving across the sky over a terminal 510. At $T_0$−4, the terminal 510 may be serviced by the satellite 514 in the orbital plane k−1 502. At $T_0$, the terminal 510 may handoff from the satellite 514 in the orbital plane k−1 502 to a satellite 512 in the orbital plane k 504.

At $T_0$+4, the terminal 510 may need to handoff. The handoff may be needed because a steering of an antenna connected to the terminal 510 is at or near the end of its range. In some embodiments, the handoff may be initiated to switch to a preferred satellite, or the like. The handoff at $T_0$+4 may be to a satellite on the orbital plane k−1 502 when the terminal 510 is disposed between the orbital plane k−1 502 and the orbital plane k 504. The handoff at $T_0$+4 may be to a satellite on the orbital plane k+1 506 when the terminal 510 is disposed between the orbital plane k 504 and the orbital plane k+1 506, for example, when the terminal 510 has moved to position 510' either due to the drift of planes in the sky (caused by the earth's spin, for example) or a movement of the terminal 510.

In some embodiments, when a preferred handoff candidate may be on an original orbital plane, a handoff to a satellite on an adjacent orbital plane and then a handoff back to the preferred satellite on the original orbital plane may be needed. The original and adjacent orbital planes form a pair, where the satellite on the adjacent plane serves as a stepping-pingstone. For the Telesat-like constellation, this may happen 12 times between these two orbital plane pair until the orbital plane on the East moves directly overhead, replacing the original orbital plane, and another orbital plane on the E may form another pair.

In case of a satellite failure, the terminal can skip the failed satellite by staying on the serving satellite twice as long before handoff, requiring the N-S direction to track twice as far, if LOS visibility permits. This can maintain a make before break handoff. After handoff, a satellite in the next orbit plane can also be skipped to allow the terminal to move back to the original preferred general pointing direction. This allow the preferred pointing range to be slightly off from the 90 degree elevation angle. The electronic scan is the worst when the orbit planes are separated the most, for example, at the equator for polar orbital planes.

Application to Inclined Orbits

Inclined orbits are often used for LEO and MEO constellations. Inclination typically creates diagonal cuts across most of the latitude except closer to the two poles. Globalstar is a classic example, Telesat is another example.

Figure 6A:
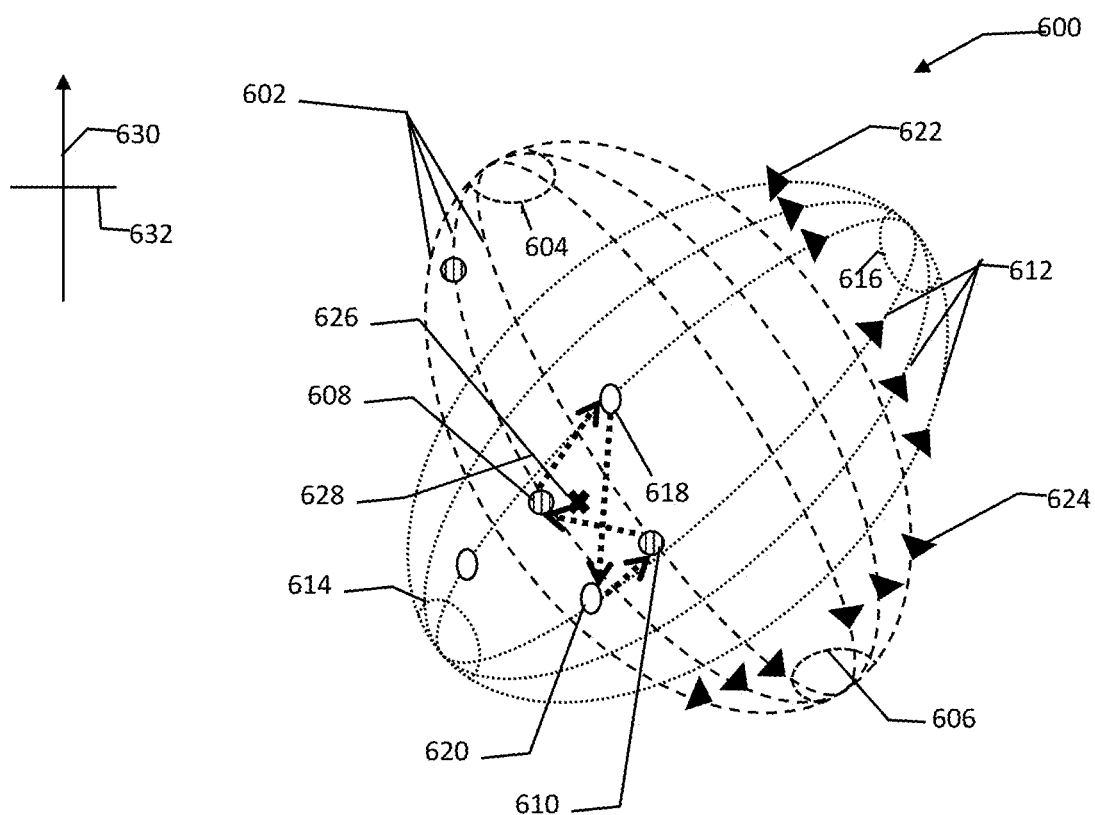
FIG. 6A illustrates a satellite network having inclined orbits according to various embodiments.

FIG. 6A illustrates a satellite network having inclined orbits according to various embodiments.

In a satellite network 600 having inclined orbits may include a first satellites 608, 610 moving in a first direction 622 along first parallel orbits 602 that intersect at a first pair of poles 604, 606, and a second satellites 618, 620 moving in a second direction 624 along second parallel orbits 612 that intersect at a second pair of poles 614, 616. The first parallel orbits 602 and the second parallel orbits 612 seem parallel and are referred to as parallel in the industry as they intersect at long distances, for example, at or near the North or South poles of the Earth. Each of the first pair of poles 604, 606 and the second pair of poles 614, 618 may be a ring around a pole, wherein the ring is within about the 80 degree latitude around the pole. A polar orbit is one in which a satellite passes above or nearly above the North and South poles of the body being orbited A polar orbit generally has an inclination of about 60-90 degrees to the body's equator. A satellite in a polar orbit passes over the equator at a different longitude on each of its orbits.

A steering of an antenna 626 may be lined up in a first axis 630, while an electronic steering of the antenna 626 may scan along a second axis 632 that is orthogonal to the first axis 630. In some embodiments, the first axis 630 may be lined up in the N-S direction, whereas the second axis 632 tracks the satellite in the E-W direction.

Each handoff jumps back and forth between one of the first satellites 608, 610 of the first parallel orbits 602 and one of the second satellites 618, 620 of the second parallel orbits 612. A handed-from satellite is a LOS (Line-of-Sight) satellite moving away from the antenna 626 along the first axis, while a handed-to satellite is a LOS satellite is moving towards the antenna 626 along the first axis; the handoff is from the handed-from to the handed-to satellite are cross plane from one another (from one of the inclined orbits to the other of the inclined orbits) at a time when the steering angle of the antenna 626 is identical (+/− a threshold error) for the handed-from to the handed-to satellite. Endpoints of lines 628 illustrate handoffs between the handed-from to the handed-to satellites (from 608 to 618, from 618 to 620, from 620 to 610, from 610 to 608).

Figure 6B:
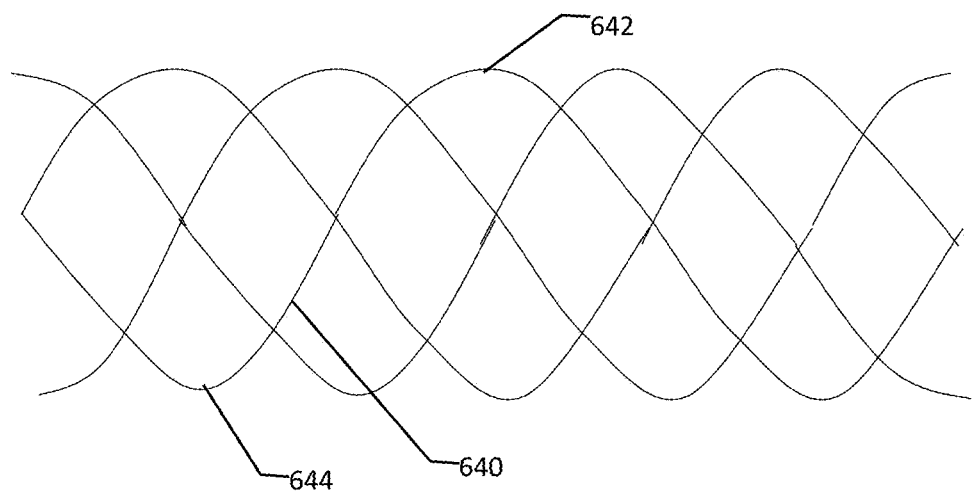
FIG. 6B illustrates orbital tracks viewed as a flat plane according to various embodiments.

FIG. 6B illustrates orbital tracks viewed as a flat plane according to various embodiments.

When orbital tracks are mapped into a flat plane like a world map, each of the orbital tracks 640 is a "S" curve, where a top part 642 and a bottom part 644 of the orbital 640 stops. In polar orbital tracks, the top part 642 and the bottom part 644 stop at a latitude about the inclination angle.

Figure 6C:
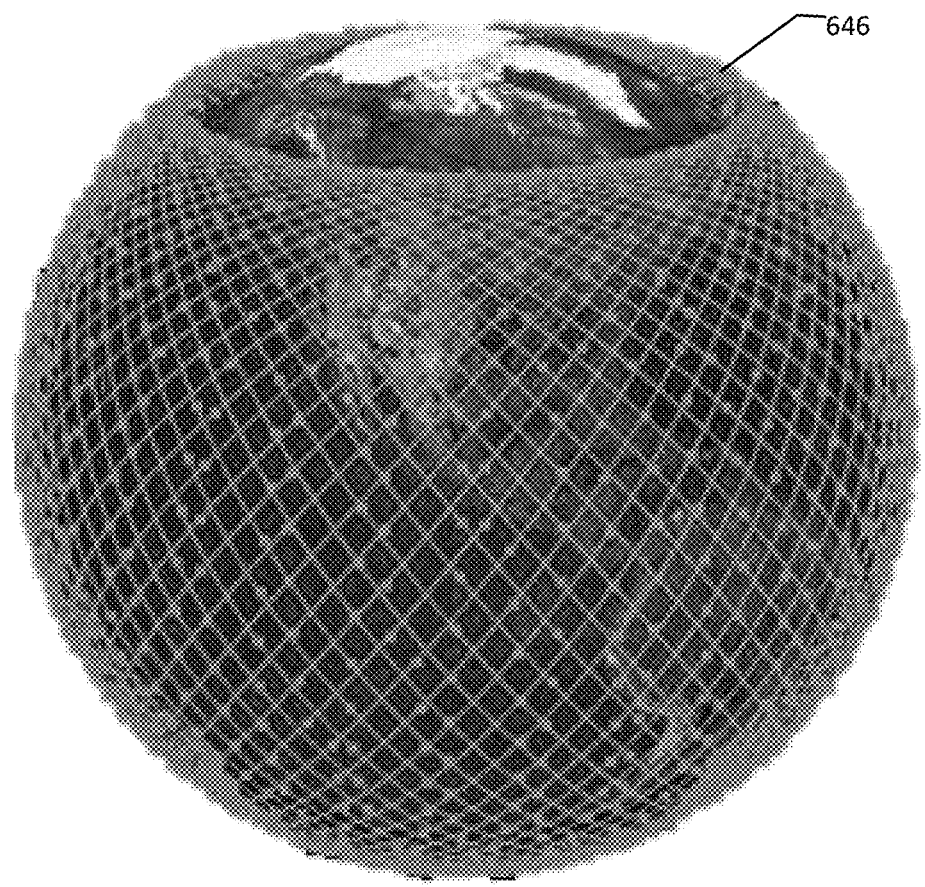
FIG. 6C illustrates orbital tracks where the flat plane map of FIG. 6B is mapped to a globe according to various embodiments.

FIG. 6C illustrates orbital tracks where the flat plane map of FIG. 6B is mapped to a globe according to various embodiments.

When the orbital tracks of FIG. 6B are folded from the flat map into a globe, the top and bottom parts become two rings that are at the latitude lines of the extremes. FIG. 6C illustrates a view of the orbit tracks from a perspective slightly tilted towards north, where only a northern ring 646 is visible. An inclination of orbits of natural or artificial satellites is measured relative to an equatorial plane of a central body they orbit, if the satellites orbit sufficiently closely. The equatorial plane is a plane perpendicular to an axis of rotation of the central body. By convention, an orbit in the same direction as a rotation of the central body is prograde, while an orbit in an opposite direction of the rotation of the central body is retrograde. By convention, satellites traversing through the equatorial plane from the south to the north are ascending nodes. Similarly, satellites traversing through the equatorial plane from the north to the south are descending nodes.

The main difference from the polar orbits to the inclined orbits is that the East-West motion is much faster than before, which is the sum of the satellite motion in that direction and the earth spin. Every handoff is a cross-plane handoffs, except at higher latitude where such movements of the satellites may flatten out. For inclined planes electronic scan angle may be larger to support cross plane handoff at the same antenna tilt angle. In some embodiments, there may no significant difference in system performance between even number and odd number of orbital planes, except that the crisscross pattern stay the same for even number of planes.

Polar orbit embodiments such as FIG. 1 are a special case of the inclined orbit embodiments such as FIG. 6A. The two poles of polar embodiments may be viewed as four poles 604, 606, 614, 616, where pairs of the four poles 604, 606, 614, 616 are substantially coincident predicated on maintaining that the first direction 622 is opposite of the second direction 624, i.e., pole 616 may be substantially coincident with pole 604 and pole 614 may be substantially coincident with pole 606.

In some embodiments, a handoff takes place when the satellites on an orbital plane pair can be covered simultaneously by two beams formed by the linear array. This condition happens 2×n times per orbital period.

For a polar orbit network, the number of handoffs is 2× otherwise required with a 2-dimensional electronic scanning array, but capable of supporting make-before-break handoff with only one reflector rather than two with 2-dimensional mechanical steering, using far less array elements than a fully electronic scanning antenna. For inclined orbits, the hybrid approach requires the same number of handoffs as required by 2 dimensional mechanical or electronic scanning. The benefits are the same as for polar orbits.

A scanning loss of the hybrid antenna applies to the E-W direction, not the N-S direction. A scan loss may be somewhat compensated by diversity combining if needed. In some embodiments, it may be possible to form nulls or form sharper beams with a linear array to suppress interference to or from other satellites in the E-W direction. This may be useful for terminals located near the equator to avoid interference with other satellites, for example, Geo-Synchronous Orbit (GEO) satellites.

To minimize the number of satellites needed to achieve certain elevation angle, for inclined orbits, the number of satellites per orbital plane may be around twice the number of orbital planes, but for higher inclination, an overweight of the number of orbital planes may be beneficial. For polar orbits, the number of satellites per plane may equal to the number of orbital planes to achieve handoffs at the highest elevation angle.

FIG. 7 illustrates a method for tracking NGSO Satellites on orbiting planes of regular motion patterns according to various embodiments.

A method 700 for tracking NGSO on orbiting planes of regular motion patterns may include operation 702 to provide a first satellites moving in a first direction along first parallel orbits that intersect at a first pair of poles, and a second satellites moving in a second direction along second parallel orbits that intersect at a second pair of poles. The method 700 may include operation 704 to steer an antenna to an antenna tilt $\varphi$ from normal with a single axis mechanism lined up with a first axis. The method 700 may include operation 706 to scan, electronically, with a linear array at a scan angle $\psi$ along a second axis. The method 700 may include operation 708 to lock to a signal from a handed-from satellite from the first satellites. The method 700 may include operation 710 to calculate, periodically, the antenna tilt $\varphi$ for the steering and the scan angle $\psi$ for the scanning.

In some embodiments, the 700 may include operation 712 to select a handed-to satellite from the second satellites. The method 700 may include operation 714 to determine an instant when an antenna tilt $\varphi'$ from normal of the handed-to satellite is equal to the antenna tilt $\varphi$ from normal of the handed-from satellite. The method 700 may include operation 716 to calculate a scan angle $\psi'$ for the handed-to satellite at the instant. The method 700 may include operation 718 to set, at the instant, the scan angle $\psi$ to the scan angle $\psi'$ to perform a handoff from the handed-from satellite to the handed-to satellite.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for tracking Non-Geo Synchronous Orbit Satellites on Orbiting Planes of Regular Motion Patterns, the method comprising:
    providing a first satellites moving in a direction descending in latitude in first orbital planes and a second satellites moving in a direction ascending in latitude in second orbital planes;
    steering an antenna to an antenna tilt $\varphi$ from normal with a single axis mechanism lined up with a first axis;
    scanning, electronically, with a linear array at a scan angle $\psi$ along a second axis;
    locking to a signal from a handed-from satellite from a first satellites; and
    selecting a handed-to satellite from the second satellites, wherein the handed-from satellite and the handed-to satellite are Line-of-sight (LOS) from the antenna at an instant of a hand-off,
    the first axis is angled from the second axis,
    the steering along the first axis and the scanning along the second axis jointly track the handed-from satellite,
    the first orbits are parallel,
    the second orbits are parallel, and
    the first orbits seem aligned with the antenna tilt $\varphi$.

2. The method of claim 1, wherein the first axis is orthogonal to the second axis.

3. The method of claim 1, further comprising receiving the antenna tilt $\varphi$ for the steering and the scan angle $\Psi$ for the scanning for a particular time period.

4. The method of claim 1, further comprising calculating, periodically, the antenna tilt $\varphi$ for the steering and the scan angle $\Psi$ for the scanning.

5. The method of claim 1, wherein the antenna tilt $\varphi$ and the scan angle $\Psi$ are calculated based on azimuth and elevation angles used in locating a celestial object from the earth surface.

6. The method of claim 1, wherein the linear array is disposed at a center-fed focal point or an offset from the center-fed focal point of the antenna.

7. The method of claim 1, wherein the direction ascending in latitude is opposite the direction descending in latitude.

8. The method of claim 1, wherein a LOS calculation of the handed-from satellite is based on a tilt range and a scan angle range of the antenna.

9. The method of claim 1, further comprising:
determining the instant when an antenna tilt $\varphi'$ from normal of the handed-to satellite is equal to the antenna tilt $\varphi$ from normal of the handed-from satellite;
calculating a scan angle $\Psi'$ for the handed-to satellite at the instant; and
setting, at the instant, the scan angle $\Psi$ to the scan angle $\Psi'$ to perform the handoff from the handed-from satellite to the handed-to satellite.

10. The method of claim 1, wherein the selecting selects from one or more satellites of the second satellites that are LOS of the antenna based on a tilt range and a scan angle range of the antenna, and selects a furthest satellite, from the antenna, from the one or more satellites of the second satellites.

11. A system to track Non-Geo Synchronous Orbit Satellites on Orbiting Planes of Regular Motion Patterns, the system comprising:
a first satellites moving in a direction descending in latitude in first orbits;
a second satellites moving in a direction ascending in latitude in second orbits;
an antenna to steer the antenna to an antenna tilt $\varphi$ from normal with a single axis mechanism lined up with a first axis;
a linear array to scan, electronically, at a scan angle $\Psi$ along a second axis; and
a receiver to lock to a signal from a handed-from satellite from the first satellites and to select a handed-to satellite from the second satellites,
wherein the handed-from satellite and the handed-to satellite are Line-of-sight (LOS) from the antenna at an instant of a hand-off,
the first axis is angled from the second axis,
the antenna steers along the first axis and the linear array scans along the second axis to jointly track the handed-from satellite,
the first orbits are parallel,
the second orbits are parallel, and
the first orbits seem aligned with the antenna tilt $\varphi$.

12. The system of claim 11, wherein the first axis is orthogonal to the second axis.

13. The system of claim 11, wherein the receiver receives the antenna tilt $\varphi$ for the steering and the scan angle $\Psi$ for the scanning for a particular time period.

14. The system of claim 11, further comprising the receiver calculates, periodically, the antenna tilt $\varphi$ for the steering and the scan angle $\Psi$ for the scanning.

15. The system of claim 11, wherein the antenna tilt $\varphi$ and the scan angle $\Psi$ are calculated based on azimuth and elevation angles used in locating a celestial object from the earth surface.

16. The system of claim 11, wherein the linear array is disposed at a center-fed focal point or an offset from the center-fed focal point of the antenna.

17. The system of claim 11, wherein the direction ascending in latitude is opposite the direction descending in latitude.

18. The system of claim 11, wherein a LOS calculation of the handed-from satellite is based on a tilt range and a scan angle range of the antenna.

19. The system of claim 11, wherein the receiver is further configured to:
determine the instant when an antenna tilt $\varphi'$ from normal of the handed-to satellite is equal to the antenna tilt $\varphi$ from normal of the handed-from satellite;
calculate a scan angle $\Psi'$ for the handed-to satellite at the instant; and
set, at the instant, the scan angle $\Psi$ to the scan angle $\Psi'$ to perform the handoff from the handed-from satellite to the handed-to satellite.

20. The system of claim 11, wherein the receiver selects from one or more satellites of the second satellites that are LOS of the antenna based on a tilt range and a scan angle range of the antenna, and selects a furthest satellite, from the antenna, from the one or more satellites of the second satellites.

* * * * *